Patented Jan. 11, 1949

2,459,014

UNITED STATES PATENT OFFICE 2,459,014

PROCESS FOR MAKING DIMETHYL TEREPHTHALATE

Robert M. Cavanaugh and James E. Lufkin, Woodbury, N. J., assignors to E. I. du Pont de Nemours & Company, Wilmington, Del., a corporation of Delaware No Drawing. Application September 27, 1946, Serial No. 699,634

2 Claims. (Cl. 260—475)

This invention relates to a novel and improved method for the esterification of terephthalic acid and more particularly to an efficient method for the production of dialkyl esters of this acid.

Terephthalic acid and its dialkyl esters have been well known compounds for many years and have considerable potential importance as chemical intermediates. The known methods for the preparation of the above esters, however, have been time-consuming, costly, and relatively inefficient from the viewpoint of yields.

An object of the present invention is a novel and more efficient method for the manufacture of dialkyl esters of terephthalic acid. A further object is such a method resulting in more efficient procedures and increased yields, and greatly reducing the time required for completion of the reaction. Additional objects will be disclosed as the invention is described more at length hereinafter.

We have found that the foregoing objects are accomplished and the disadvantages of prior art methods overcome when we react terephthalic acid and a monohydric aliphatic alcohol at an elevated temperature in the presence of a catalyst and maintain the reactants at a pressure above atmospheric during the reaction. In the preparation of the dimethyl ester of terephthalic acid, for example, we react terephthalic acid and methanol and desirably use sulfuric acid as catalyst, a preferred amount of catalyst, calculated as 100% $H_2SO_4$, being between 1 and 10 times the weight of terephthalic acid. A suitable internal gage pressure within the autoclave is between 15 and 100 lb. per square inch.

The following examples will serve as specific embodiments of the procedure practiced in carrying out the invention, but it will be understood that these are given by way of illustration only and are not to be taken as limiting in any way.

Example 1

Sulfuric acid and methanol were charged into an autoclave, 20 lb. of methanol being used and 5 lb. of 100% sulfuric acid. Actually the sulfuric acid was added at about 45% strength, hence considerable water was present also. One pound of crude terephthalic acid, 90% purity, was then introduced and the mixture was heated to a temperature of 105° C. The pressure at that temperature was approximately 50 lb. per square inch gage. The charge was held at 105° C. for one half hour, with refluxing, and was then cooled to below 30° C. The mixture was removed from the reactor, and the dimethyl terephthalate separated from the mother liquor. After successive washings with methanol and water, material of a melting point of 139.7° C. was obtained in practically a 100% yield on the terephthalic acid used. The advantages of the process are apparent from the fact that a similar run under atmospheric pressure required around seven hours for completion.

Example 2

Under similar conditions, 12 lb. of terephthalic acid, 180 lb. of methanol and 36 lb. of 100% sulfuric acid were charged into a stainless steel autoclave, the sulfuric acid again being added as 45% $H_2SO_4$. One pound of hydrated copper sulfate was used also ($CuSO_4.5H_2O$) for the purpose of inhibiting corrosion. The ratio of sulfuric acid (100%) to terephthalic acid, therefore, was 3 to 1 in this example, as against 5 to 1 in Example 1. The charge was heated to around 110° C. and maintained at that temperature for one half hour, the gage pressure being approximately 50 lb. per square inch. After removing the charge from the autoclave, separating the dimethyl terephthalate from the mother liquor and washing the crystals with methanol and water successively, a substantially 100% yield of good quality material was obtained calculated on the terephthalic acid present.

Example 3

A similar procedure was followed in this example, except that a very greatly reduced amount of catalyst was used. The autoclave was charged with one pound of terephthalic acid, 20 lb. of methanol and 0.02 lb. of 100% sulfuric acid, introduced as dilute acid. The methanol-terephthalic acid ratio was 20 to 1 by weight, as in Example 1. The mixture was heated to around 110° C. and maintained there for six hours with a resulting gage pressure of about 50 p. s. i. After cooling of the charge, separation of the dimethyl terephthalate from the mother liquor, and washing of the crystals, a conversion of about 81% was obtained. A certain amount of unreacted terephthalic acid remained, which was available for further treatment. While a considerably longer time was required in this example with the very low catalyst ratio, the advantage of pressure esterification was very definite, as a similar run under atmospheric pressure required a reaction time of 68 hours.

The foregoing examples have cited the preparation of the dimethyl ester of terephthalic acid by the method of the invention. The method is likewise applicable, however, to the production of other dialkyl esters of terephthalic acid, for example, the diethyl, dipropyl, diallyl, and other such esters. In the preparation of such esters, the corresponding alcohol will, of course, be used as starting material, i. e., ethanol, propanol, and allyl alcohol, respectively, and the method is applicable especially in the case of monohydric alcohols having boiling points below 100°C.

The chemical reaction taking place in the formation of dimethyl terephthalate from terephthalic acid is as follows:

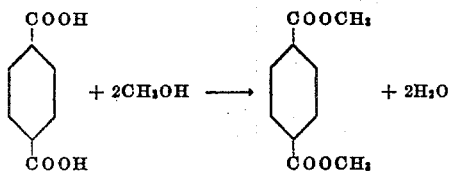

A number of different catalysts can be used in carrying out the invention, for example, various mineral acids. We find sulfuric acid very satisfactory for this purpose, and particularly in the case of dimethyl terephthalate prefer to use an amount of sulfuric acid, calculated as 100% $H_2SO_4$, amounting to between 1 and 10 times the weight of terephthalic acid, and desirably above 3 times this weight, because of the favorable effect on the rapid completion of the reaction. A relatively high ratio of methanol to terephthalic acid is desirably used, ratios of 15-20 to 1 being cited in the examples, this excess tending to displace the reaction equilibrium in the desired direction. The methanol serves as a suitable reaction medium as well as a reactant, but the amount of excess is not critical. It will be understood that crude terephthalic acid may be utilized for esterification, if desired, and that the commonly occurring contaminants bring in no serious complications.

In the reaction between terephthalic acid and alcohol, two molecules of water are formed for each molecule of terephthalic acid. It is desirable to recycle the mother liquors back to the process, in order to avoid excessive losses of methanol and sulfuric acid, but at the same time removal of the water formed during the reaction is essential. We have found a desirable procedure to comprise filtration of the terephthalic ester, and separation from the process of sufficient of the mother liquor to ensure removal of an amount of water equivalent to the reaction water, a portion of the impurities, of course, being removed at the same time. The remainder and larger part of the mother liquor is then returned to the process, fresh methanol being added and sufficient sulfuric, desirably in the form of oleum, to bring the ratios of reactants back to the original values.

In carrying out the process of the invention, we preferably use a temperature above the normal boiling point of the alcohol, and desirably a temperature above 100° C. is used. Under such conditions in a closed vessel, super-atmospheric pressures result and a feature of the invention is this use of elevated pressures, desirably between 15 and 100 lb. per square inch (gage).

The method of the present invention possesses decided advantages over prior art procedures, particularly from the view point of rapidity of completion of the reaction. Whereas previously substantial esterification of terephthalic acid required 7 or 8 or more hours, the process of our invention allows almost complete reaction in not more than ½ hour. At the same time, excellent yields are obtained and a product of high quality.

While the invention has been described at length in the foregoing, it will be understood that many variations may be introduced in details of procedure and proportions and exact nature of reactants without departure from the scope of the invention. We intend to be limited, therefore, only by the following claims:

We claim:

1. The process for manufacturing dimethyl terephthalate, which comprises reacting terephthalic acid and methanol in the presence of sulfuric acid as a catalyst in a net amount greater than 1 and less than 10 times the amount of terephthalic acid by weight, introducing said sulfuric acid initially in relatively dilute form and carrying out the reaction at a temperature above the normal boiling point of methanol and at a gage pressure between 15 and 100 lb. per square inch.

2. The process for manufacturing dimethyl terephthalate which comprises reacting terephthalic acid and methanol in the presence of sulfuric acid as catalyst in a net amount exceeding 3 parts per part of terephthalic acid by weight, introducing said sulfuric acid initially in relatively dilute form and carrying out the reaction at a temperature above the normal boiling point of methanol and at a gage pressure between 15 and 100 lbs. per square inch.

ROBERT M. CAVANAUGH.
JAMES E. LUFKIN.

REFERENCES CITED

The following references are of record in the file of this patent:

UNITED STATES PATENTS

| Number | Name | Date |
| --- | --- | --- |
| 1,732,392 | Weitzel | Oct. 22, 1929 |
| 1,791,238 | Fuchs | Feb. 3, 1931 |
| 1,993,736 | Graves et al. | Mar. 12, 1935 |

OTHER REFERENCES

Ullman et al., "Berichte," vol. 37 (1904), pages 2002-2003.